July 12, 1960 R. J. LANE ET AL 2,944,765
JET-PROPELLED AIRCRAFT
Filed Aug. 27, 1959 2 Sheets-Sheet 1

Inventors
Raymond John Lane
Raymond Frederick Sargent
By
Bailey, Stephens + Huettig
Attorneys

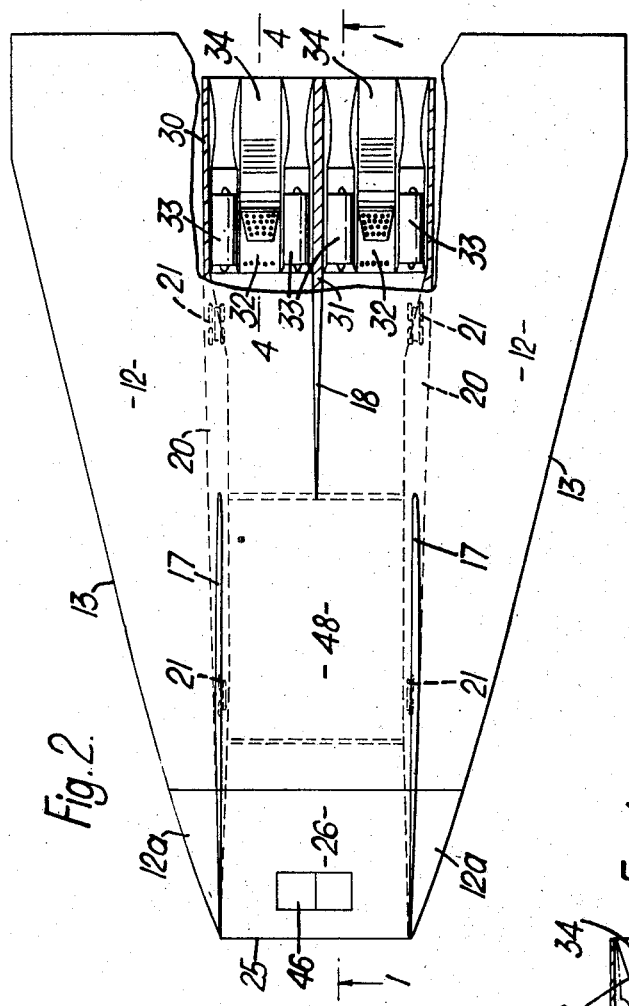
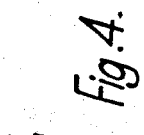

United States Patent Office 2,944,765
Patented July 12, 1960

2,944,765
JET-PROPELLED AIRCRAFT

Raymond John Lane and Raymond Frederick Sargent, Bristol, England, assignors to Bristol Siddeley Engines Limited, Bristol, England, a British company Filed Aug. 27, 1959, Ser. No. 836,481

Claims priority, application Great Britain Sept. 1, 1958

7 Claims. (Cl. 244—15)

The invention concerns an aircraft propelled by air-heating engines and intended for flight at supersonic speeds, and is that the aircraft comprises a body of substantially rectangular section and substantially constant width and depth, and a wing with a swept back leading edge on each side of the body, the body being pierced from end to end by an airflow duct at least a forward portion of which is of rectangular cross-section and extends across the whole width of the rectangular section body, the duct terminating at the forward end of the body in an air intake opening bounded on one horizontal side by a compression surface oblique to the direction of flight, a rear end portion of the duct occupying the whole width and depth of the rectangular section body and containing air heating means and a propulsion nozzle system, and an intermediate portion of the duct being divergent so as to constitute a diffuser.

Forward of the rear end portion containing the air heating means, the height of the duct preferably diminishes in a forward direction while the width is maintained approximately constant. One of the horizontal walls of the body preferably also constitutes a wall of the duct so that the space remaining within the body is substantially wholly disposed between the duct and the other horizontal wall of the body. This space may be used to accommodate travelling personnel and/or fuel.

A wedge-shaped foremost portion of the body, bounded in part by the compression surface oblique to the direction of flight and in part by part of one of the horizontal walls of the body, may be connected to a subsequent portion of the body for pivoting about a transverse horizontal axis so that it may be moved into a position in which the leading edge of the wedge is displaced towards the other horizontal wall of the body.

These and other features of the invention will be described in more detail by reference to a particular example shown schematically in the accompany drawing. In the drawing:

Figure 4 is a vertical section through one of the propulsion engines, taken on the line 4—4 in Figure 2.

Figure 3:
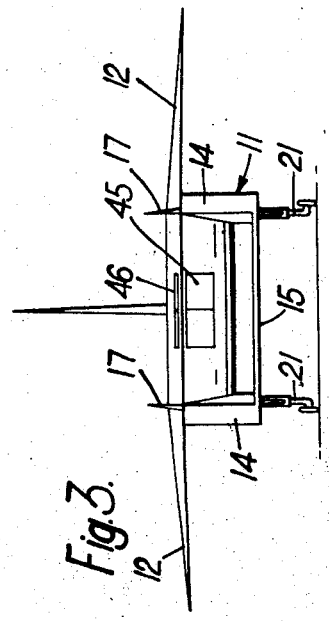
Figure 3 is a front end elevation.

The aircraft comprises a body 11 of substantially rectangular section, as may best be seen from Figure 3, and substantially constant width and depth, and a wing 12 with a swept back leading edge 13 on each side of the body. The wings are preferably arranged in the high-wing position. The body is bounded by two side walls 14, a bottom wall 15 and a top wall 16, the upper surface of the latter being in continuous alignment with the upper surfaces of the wings 12 but partly separated by two airflow control fences 17 extending over about the forward half of the body in alignment with the side walls 14. A vertical fin 18 projects upwardly from the top of the body and extends over about the rear half of its length.

Figure 1:
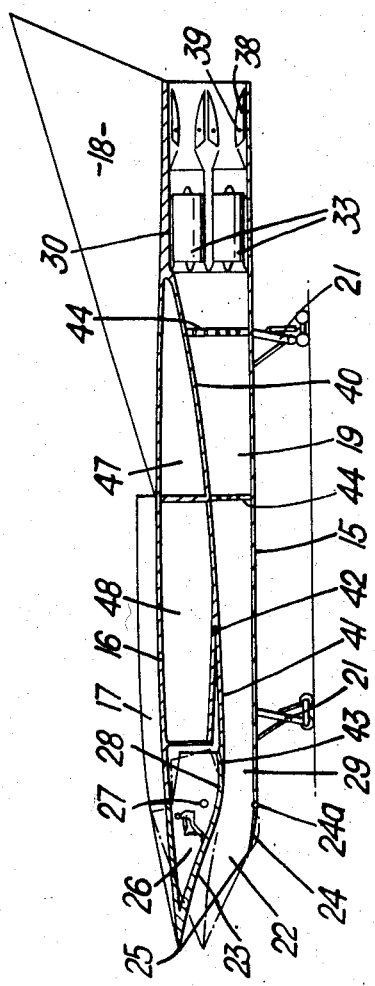
Figure 1 is a sectional elevation taken on a vertical-longitudinal plane through the body as indicated by the line 1—1 in Figure 2, which is a top plan view of the aircraft with part of the upper wall of the body cut away to reveal propulsion engines.

The body 11 is pierced from end to end by an airflow duct 19 which is of rectangular cross-section throughout its length and extends across practically the whole width of the body, leaving only side wall cavities 20 of sufficient width to house retractable landing gear 21. The duct terminates at the forward end of the body in an air intake opening 22 bounded on its upper side by a compression surface 23 oblique to the direction of flight. As will be seen from Figure 1 the bottom wall 15 of the body also constitutes a wall of the duct 19 and at its forward end forms the lower boundary 24 of the intake opening 22. The upper wall 16 of the body meets the compression surface 23 at a sharp leading edge 25 so that a foremost part 26 of the body is wedge-shaped. This part of the body, including portions 12a of the wings, is connected to the main part by a transverse horizontal pivot 27 so that it can be tilted downwards into a position indicated by chain-dotted lines in which the leading edge of the wedge is displaced towards the wall 15. This position of the wedge-shaped part 26 is used at flying speeds substantially below the cruising speed for which the aircraft is designed in order to reduce the drag at these speeds. A rearward continuation 28 of the compression surface 23 is shaped to form a throat 29 in the duct 19 rearwardly of the pivot 27 when the wedge-shaped part is in its raised position, so that this throat is enlarged and displaced forwards when the wedge-shaped part is tilted downwards. The foremost part of the lower wall 15, constituting the lower boundary 24 of the intake opening, is also mounted to turn about a pivot 24a. The movements of the body part 26 and the lower boundary 24 are co-ordinated, by means not shown, so that when the body part 26 is tilted downwards to its lowermost position the boundary 24 is also tilted downwards, and as the part 26 is raised the boundary 24 is first tilted upwards and then lowered into alignment with the wall 15.

Rearwards from the throat 29 to the beginning of a parallel portion 30 the height of the duct 19 increases so that it acts as a diffuser to reduce the speed and increase the pressure of the inflowing air. In a forward part of the parallel portion are arranged air heating propulsion engines which are preferably partly of turbojet type and partly simple combustors forming a ramjet system with the intake 22 and diffuser duct 19. In the example illustrated, the parallel portion 30 is divided into two bays by a vertical partition 31 and each bay houses a combustor 32 and four turbojet engines 33 grouped as two pairs of superimposed engines on each side of the combustor. The heated airstreams from all the engines are discharged from the rear end of the body through adjustable convergent-divergent propulsion nozzles. The nozzles 34 for the combustors may be of a kind, illustrated in Figure 4, in which the outlet area remains constant while the throat area is varied. This is achieved by providing forward and rear boundary members 35 and 36 which are pivoted respectively at their forward and rear edges so that they can be moved from the position shown in full lines to that shown in chain-dotted lines. The nozzles 37 for the turbojet engines provide for variation of the outlet area and preferably also of the throat area. This may be done in the manner illustrated in Figure 1, using boundary members 38 extending from the throat to the outlet and pivoted at an intermediate point 39.

The upper wall of the diffuser part of the duct 19 is constituted by a fixed part 40 and a movable part 41 which is hinged at its rear edge 42 to the fixed part 40 and at its forward edge 43 is kept in engagement with the throat-forming extension 28 of the compression surface. The walls 15 and 40 may be interconnected at intervals by airflow straightening grids 44 constituting structural members.

By virtue of the fact that the duct 19 follows the lower wall 15 of the body, the space remaining within the body is substantially wholly disposed between the upper wall 28, 40, 42 of the duct and the upper wall 16 of the body. A forward part of this space constitutes the tilting wedge-shaped part 26 and may be used as crews' quarters, observation windows 45 and 46 being provided in the compression surface 23 and the upper wall of the wedge respectively, while a rear part 47 may be used for the carriage of fuel. An intermediate part 48 of approximately uniform height is admirably adapted for the accommodation of passengers. Additional supplies of fuel may be carried in the wings.

We claim:

1. An aircraft for flight at supersonic speeds, comprising a body of substantially rectangular section and substantially constant width and depth, and a wing with a swept back leading edge on each side of the body, the body being pierced from end to end by an airflow duct at least a forward portion of which is of rectangular cross-section and extends across the whole width of the rectangular section body, the duct terminating at the forward end of the body in an air intake opening bounded on one horizontal side by a compression surface oblique to the direction of flight, a rear end portion of the duct occupying the whole width and depth of the rectangular section body and containing air heating means and a propulsion nozzle system, and an intermediate portion of the duct being divergent so as to constitute a diffuser.

2. An aircraft according to claim 1 in which, forward of the rear end portion containing the air heating means, the height of the duct diminishes in a forward direction while the width is maintained approximately constant.

3. An aircraft according to claim 2 in which one of the horizontal walls of the body constitutes a wall of the duct so that the space remaining within the body is substantially wholly disposed between the duct and the other horizontal wall of the body.

4. An aircraft according to claim 1 in which a wedge-shaped foremost portion of the body, bounded in part by the compression surface oblique to the direction of flight and in part by part of one of the horizontal walls of the body, is connected to a subsequent portion of the body for pivoting about a transverse horizontal axis so that it may be moved into a position in which the leading edge of the wedge is displaced towards the other horizontal wall of the body.

5. An aircraft according to claim 4 in which the wedge-shaped portion is connected to the upper wall of the body, and contains crew accommodation.

6. An aircraft according to claim 1 in which the upper surface of the body is in continuous alignment with the upper surface of the wings.

7. An aircraft according to claim 1 in which the air heating means includes at least one combustor forming with the diffuser a ramjet, and at least one turbojet engine receiving air from the same diffuser.

References Cited in the file of this patent

UNITED STATES PATENTS 2,877,965     Wakefield _____ Mar. 17, 1959

FOREIGN PATENTS 817,507     Great Britain _____ July 29, 1959